US012717585B2

(12) United States Patent
Assemat et al.

(10) Patent No.: US 12,717,585 B2
(45) Date of Patent: Aug. 25, 2026

(54) DEVICE WITH COMMAND LIST EXECUTION AND RELATED METHOD

(71) Applicants: STMICROELECTRONICS (GRENOBLE 2) SAS, Grenoble (FR); STMICROELECTRONICS (ROUSSET) SAS, Rousset (FR)

(72) Inventors: Valerie Assemat, Champagnier (FR); Isabelle Carnel, Presles (FR); Edwin Hilkens, Coublevie (FR); Jean Claude Bini, Tourrettes-sur-loup (FR)

(73) Assignees: STMICROELECTRONICS (GRENOBLE 2) SAS, Grenoble (FR); STMICROELECTRONICS (ROUSSET) SAS, Rousset (FR)

( * ) Notice: Subject to any disclaimer, the term of this patent is extended or adjusted under 35 U.S.C. 154(b) by 647 days.

(21) Appl. No.: 17/583,104

(22) Filed: Jan. 24, 2022

(65) Prior Publication Data

US 2023/0236839 A1 Jul. 27, 2023

(51) Int. Cl.
*G06F 9/4401* (2018.01)
*G06F 9/48* (2006.01)

(52) U.S. Cl.
CPC .......... *G06F 9/4403* (2013.01); *G06F 9/4818* (2013.01)

(58) Field of Classification Search
CPC ............................. G06F 9/4818; G06F 9/4403
USPC .......................................................... 718/102
See application file for complete search history.

(56) References Cited

U.S. PATENT DOCUMENTS

| | | | | |
|---|---|---|---|---|
| 3,755,001 | A | 8/1973 | Kooi et al. | |
| 5,499,384 | A | 3/1996 | Lentz et al. | |
| 5,519,883 | A | 5/1996 | White et al. | |
| 5,723,360 | A | 3/1998 | Iwasaki | |
| 6,243,629 | B1 * | 6/2001 | Sugimoto | G05B 19/0428 701/76 |
| 6,427,180 | B1 | 7/2002 | Bastian et al. | |
| 7,533,195 | B2 | 5/2009 | Hayden | |
| 8,073,974 | B2 | 12/2011 | Rapp et al. | |
| 9,043,770 | B2 | 5/2015 | Aliseychik et al. | |
| 2008/0309474 | A1 * | 12/2008 | Okamoto | B60K 35/00 340/462 |
| 2010/0138728 | A1 | 6/2010 | Kim et al. | |
| 2010/0169696 | A1 | 7/2010 | D'Angelo et al. | |
| 2012/0025266 | A1 | 2/2012 | Griebenow et al. | |

(Continued)

FOREIGN PATENT DOCUMENTS

| | | |
|---|---|---|
| CN | 101529383 A | 9/2009 |
| EP | 1398698 A1 | 3/2004 |

(Continued)

*Primary Examiner* — Hiren P Patel
*Assistant Examiner* — Ross Michael Vincent
(74) *Attorney, Agent, or Firm* — Seed IP Law Group LLP

(57) ABSTRACT

A device includes an application processor and a hardware signal processor coupled to the application processor. The hardware signal processor, in operation: receives a command pre-list during an initialization phase of the hardware signal processor, the command pre-list including a plurality of function describers, each of the plurality of function describers being associated with a respective plurality of parameter describers; generates a command list based on the command pre-list during the initialization phase; and stores the command list in memory circuitry.

21 Claims, 7 Drawing Sheets

(56) References Cited

U.S. PATENT DOCUMENTS

2013/0111446 A1* 5/2013 Garst, Jr. .............. G06F 11/362 717/124
2014/0095943 A1* 4/2014 Kohlenberg .......... G06F 11/008 714/E11.179
2015/0199554 A1* 7/2015 Merrell .............. G06V 40/1312 382/124
2017/0064073 A1* 3/2017 Spencer .......... H04M 1/724631
2017/0212760 A1* 7/2017 Bhaskaran ............ G06F 9/3802
2017/0329629 A1 11/2017 Maruyama
2018/0181508 A1 6/2018 Mitsuishi
2019/0074283 A1* 3/2019 Amaki ................... G11C 16/16
2020/0145558 A1 5/2020 Ferrand
2020/0167343 A1 5/2020 Cseri et al.
2020/0210365 A1* 7/2020 Wilkinson .......... G06F 9/30145
2021/0119848 A1* 4/2021 Ibars Casas .......... H04L 1/0052
2021/0358999 A1 11/2021 Kishimoto
2022/0291947 A1* 9/2022 Alaparthi .............. G06F 3/0604
2023/0124662 A1* 4/2023 Agarwala .............. G06V 20/52 382/103
2023/0138635 A1* 5/2023 Chodor ................. G06F 9/5044 345/501
2023/0161646 A1 5/2023 Carnel et al.

FOREIGN PATENT DOCUMENTS

EP 3502949 A1 6/2019
EP 3650980 A2 5/2020
JP S472519 A 2/1972
JP H07211692 A 8/1995
JP 2000323787 A 11/2000
JP 2002208725 A 7/2002
JP 2004119563 A 4/2004
JP 2004179404 A 6/2004
JP 2010532916 A 10/2010
JP 2014072217 A 4/2014
KR 100663910 B1 1/2007
WO 02061582 A2 8/2002
WO 2020100292 A1 5/2020

* cited by examiner

DEVICE WITH COMMAND LIST EXECUTION AND RELATED METHOD

BACKGROUND

Technical Field

The present disclosure is related to electronic devices, and more particularly, but not exclusively, to execution of stored command lists by a signal processor in response to an event trigger.

Description of the Related Art

In various devices and applications, data received from multiple sensors (e.g., accelerometer, gyroscope, magnetometer, radar, time-of-flight, photographic, location/navigation and/or videographic, and others) may be combined in order to provide more sophisticated functions. For example, mobile devices, automobiles and virtual reality systems may include image stabilization subsystems (e.g., Optical Image Stabilization and/or Electronic Image Stabilization) that utilize data from multiple sensors.

A digital signal processor (DSP) may provide a variety of processing functions that operate on data from sensors or other sources. The DSP generally has circuitry that is faster, or more efficient, than that of a general purpose processor when performing a set of functions. As such, some processing of the data from sensors or other sources may be offloaded to the DSP to speed up the processing, save power, or both. A compiler or interpreter may be used to program the DSP to provide new functions, for example, by updating firmware of the DSP.

BRIEF SUMMARY

In an embodiment, a device includes an event interface and processing circuitry coupled to the event interface. The event interface receives an event trigger, the event trigger being associated with a command list, the command list being stored in memory circuitry. The command list includes command sets, each of which includes a function identifier and a plurality of parameter identifiers. The processing circuitry executes the command list in response to the received event trigger, generating output data; and stores the output data. The function identifier is associated with a function of the processing circuitry.

In an embodiment, a system includes an application processor and a hardware signal processor. The application processor generates event triggers. The hardware signal processor is electrically connected to the application processor. The hardware signal processor receives an event trigger. The event trigger is associated with a command list stored in memory circuitry. The command list includes a plurality of command sets. A command set of the plurality of command sets includes a function identifier and a plurality of parameter identifiers. The function identifier is associated with a function of the hardware signal processor. The hardware signal processor executes the command list in response to the received event trigger, generating output data, and stores the output data.

In one embodiment, a method includes: generating and storing a plurality of command lists, each of the plurality of command lists including a plurality of function identifiers and a plurality of respective parameter identifiers, each of the plurality of function identifiers being associated with a function of a hardware signal processor; initializing a plurality of respective buffers associated with the plurality of parameter identifiers of the plurality of command lists; associating a plurality of respective event triggers with the plurality of command lists; executing one of the plurality of command lists by the hardware signal processor, the executing being in response to a received event trigger, the executing generating output data; and storing the output data.

In one embodiment, a non-transitory computer-readable medium causes one or more processors to perform one or more automated operations. The automated operations include: generating and storing a plurality of command lists, each of the plurality of command lists including a plurality of function identifiers and a plurality of respective parameter identifiers, each of the plurality of function identifiers being associated with a function of a hardware signal processor; initializing a plurality of respective buffers associated with the plurality of parameter identifiers; associating a plurality of respective triggers with the plurality of command lists; and executing one of the plurality of command lists by the hardware signal processor (HSP), the executing being in response to a received trigger, the executing generating output data.

In one embodiment, a device includes an application processor and a hardware signal processor coupled to the application processor. The hardware signal processor, in operation: receives a command pre-list during an initialization phase of the hardware signal processor, the command pre-list including a plurality of function identifiers, each of the plurality of function identifiers being associated with a respective plurality of parameter identifiers; generates a command list based on the command pre-list during the initialization phase; and stores the command list in memory circuitry.

BRIEF DESCRIPTION OF THE SEVERAL VIEWS OF THE DRAWINGS

Reference will now be made by way of example only to the accompanying drawings. In the drawings, identical reference numbers identify similar elements or acts, and reference numbers identical but for a different suffix identify similar elements or acts, unless the context indicates otherwise. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

Figure 1:
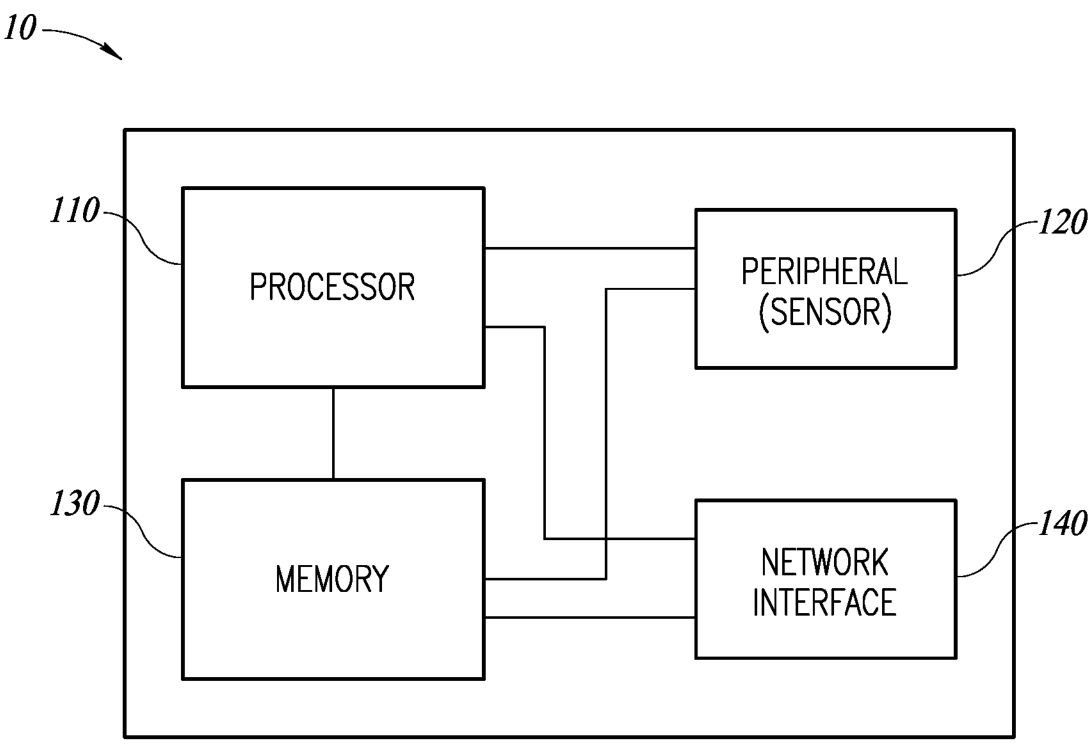
FIG. 1 is a schematic diagram of a system in accordance with various embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Embodiments of the disclosure generate and store command lists, without use of a compiler, that may be executed by the HSP in response to a variety of event triggers. Each command list may include one or more command sets, each of which includes a function identifier associated with a function of the HSP (e.g., a finite impulse response (FIR) function, an average function, or the like), and one or more parameter identifiers associated with buffers (e.g., input buffers, output buffers, or the like) in memory circuitry used by the function of the HSP and accessible by the HSP. Each command list is associated with an event trigger. The event triggers may be generated by peripherals (e.g., one of the sensors), the application processor, the HSP, or other suitable sources. When the HSP receives an event trigger, the HSP executes the associated command list. Execution of the command list may be uninterruptible and may result in generation of output data, which may be utilized, for example, by the application processor to perform another function, such as automated driving of a vehicle.

Use of command lists built from a set of selected functions of the HSP allows for generation of sophisticated functions (e.g., the command lists) without the complexity of a compiler or interpreter, which improves speed, reactivity and flexibility of the system including the HSP. The HSP may execute the command list autonomously, which allows the application processor to enter a low-power mode to save power while the HSP is executing the command list.

FIG. 1 illustrates a system 10 in accordance with various embodiments of the disclosure. The system 10 generates sophisticated functions based on data samples received from peripheral 120, which may be a sensor. For example, an autonomous driving function of an automobile may be performed by integrating sensor data samples from multiple peripherals 120, including cameras, accelerometers, global positioning/navigation receivers, radar sensors and ultrasonic sensors. A motor control process may be performed by the system 10, including sample-by-sample processing using trigonometric functions and filter functions. In some embodiments, the system 10 performs metering or audio processing processes, which may include vector processing functions.

The system 10 includes device 110 (e.g., a processor), peripheral 120, memory 130 and network interface 140. The system 10 may be an electronic system, or electronic control system, of an automobile, virtual reality hardware, augmented reality hardware, a power supply, an electric motor, a metering system, an audio system, or the like. As described above, the system 10 may provide one or more sophisticated functions that are based on integration, or fusion, by the device 110 of data samples generated by the peripheral 120.

The device 110 integrates the data samples generated by the peripheral(s) 120 to generate sophisticated functions (e.g., autonomous driving, metering, or the like). In one embodiment, the device 110 is a microcontroller unit (MCU), a microprocessor unit (MPU), or the like. The device 110 may be a system-on-a-chip (SOC).

The device 110 is coupled to the memory 130, which may be system memory, and include memory circuitry. Coupling between the device 110 and the memory 130 may be by way of a memory interface, such as a double data rate (DDR) interface, a low-power DDR (LPDDR) interface, or the like.

The device 110 is coupled to the peripheral 120. In one embodiment, the device 110 is coupled to multiple peripherals 120. A single peripheral 120 is illustrated in FIG. 1 for simplicity. Coupling between the device 110 and the peripheral 120 may be by a peripheral interface, such as a serial peripheral interface (SPI), an inter-integrated circuit (IIC, I2C) interface, or other suitable peripheral interface.

The device 110 is coupled to the network interface 140, which may include an Ethernet interface or the like. In one embodiment, one or more of the peripheral 120 and the network interface 140 is coupled to the memory 130. The device 110 may be in communicative connection with external electronic devices or components through the network interface 140.

In one embodiment, the peripheral 120 is a sensor. For example, the peripheral 120 may be or include a camera, an accelerometer, a navigation sensor, a time-of-flight sensor, a gyroscope, an inertial sensor, a humidity sensor, a compass, a microphone, a pressure sensor, a gas sensor, or the like. In one embodiment, the system 10 includes a plurality of peripherals 120, such as a plurality of cameras, a plurality of accelerometers, a navigation sensor, a plurality of time-of-flight sensors, other sensors, combinations thereof, or the like. The peripherals 120 may include micro-electro-mechanical systems (MEMS) sensors. Each of the peripherals 120 generates data samples. For example, the data samples may include images, positional coordinates, depths or distances, temperatures, pressures, humidity, audio signals, or the like.

Figure 2:
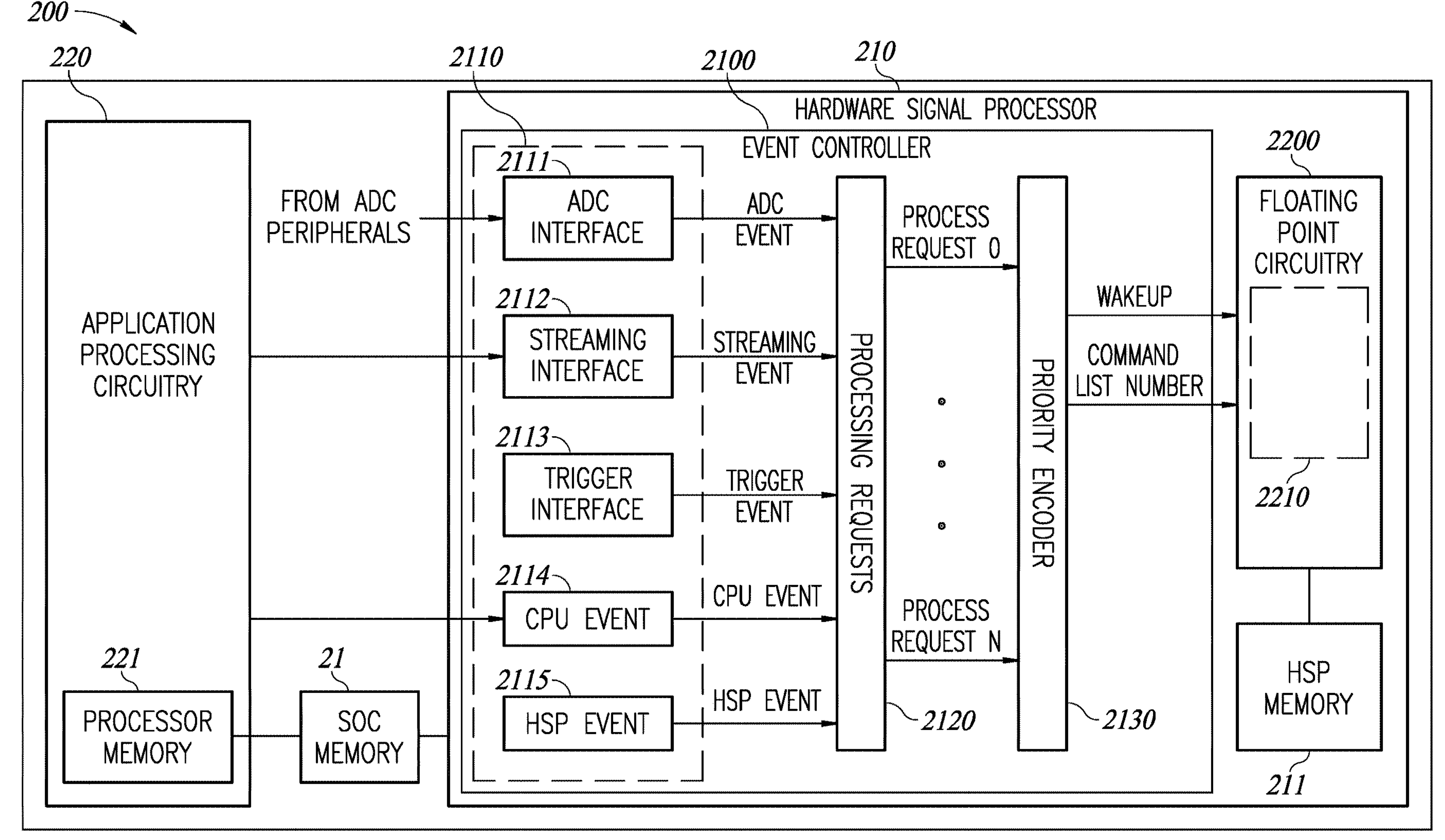
FIG. 2 is a schematic diagram of a device in accordance with various embodiments.

FIG. 2 illustrates a processor 200 in accordance with various embodiments. The processor 200 may be employed as the device 110 of FIG. 1. The processor 200 includes application processing circuitry 220, hardware signal processor 210, and device memory 21. The processor 200 may be a general purpose processor, a microprocessor unit (MPU), a microcontroller unit (MPU), a central processing unit (CPU) or the like. The processor 200 may be a system-on-a-chip (SOC). The processor 200 may integrate sensor data samples or other data of the peripheral(s) 120 to provide sophisticated functions.

For example, sensor data samples from multiple sensors are integrated (or "fused") by a processor or microcontroller unit (MCU) (or "device") to provide more sophisticated functions. An autonomous driving function of an automobile may be performed by integrating sensor data samples from multiple sensors, including cameras, accelerometers, global positioning/navigation receivers, radar sensors and ultrasonic sensors.

A number of signal processing operations may be performed on received sensor data. For example, a motor control process may include sample-by-sample processing including trigonometric functions and filter functions. Metering or audio processing processes may include vector processing functions. Offloading the trigonometric, filter and vector processing functions to a hardware signal processor (HSP, or "signal processing engine" (SPE)) may speed up processing and reduce power consumption compared to executing the functions on an application processor. Use of a compiler or interpreter to update firmware of the HSP to establish sophisticated functions on the HSP introduces complexity.

The application processing circuitry 220 may be an application processing unit (APU), central processing unit (CPU), host processor, or the like, and may be referred to as the "APU 220". The application processing circuitry 220 includes one or more processing cores. In one embodiment, the application processing circuitry 220 includes an arithmetic logic unit, which may include one or more of adder circuitry, shift register circuitry, carry/rotate logic circuitry, clock circuitry, control circuitry and the like. The application processing circuitry 220 includes processor memory 221, such as a cache memory. The application processing circuitry 220 is coupled to the hardware signal processor 210 and to the device memory 21.

The device memory 21 may be device memory circuitry. The device memory 21 may be memory circuitry of an SOC, and may be referred to as SOC memory. The device memory 21 is generally located in a region of the processor 200 outside the application processing circuitry 220 and the hardware signal processor 210. The device memory 21 is coupled to the application processing circuitry 220 and to the hardware signal processor 210. The device memory 21 may be shared by the application processing circuitry 220 and the hardware signal processor 210, such that the application processing circuitry 220 may write processor data to the device memory 21, the hardware signal processor 210 may write HSP data to the device memory 21, and the application processing circuitry 220 and the hardware signal processor 210 may each read data (e.g., the processor data or the HSP data) from the device memory 21.

The hardware signal processor 210 may be or include a digital signal processor (DSP), signal processing engine (SPE), or the like. The hardware signal processor 210 is coupled to the application processing circuitry 220 and the device memory 21. In some embodiments, the hardware signal processor 210 is coupled to electronic components external to the processor 200. For example, the hardware signal processor 210 may be coupled directly to the peripherals 120. The hardware signal processor 210 receives data from the application processing circuitry 220, the peripherals 120, other sources, or a combination thereof, and generates output data by performing processing operations (e.g., mathematical operations) on the data. The processing operations performed by the hardware signal processor 210 may be identified in stored command lists, such that the hardware signal processor 210 may perform multiple processing operations on the data in response to a single event trigger. The hardware signal processor 210 may include an event controller 2100, HSP processing circuitry 2200, and HSP memory 211.

The HSP processing circuitry 2200 (or "hardware processing circuitry 2200") performs the data processing operations of the hardware signal processor 210. In one embodiment, the HSP processing circuitry 2200 is or includes floating point processing circuitry. The HSP processing circuitry 2200 is coupled to the event controller 2100 and HSP memory 211. The HSP processing circuitry 2200 is in data communication with the event controller 2100. The HSP processing circuitry 2200 has stored therein a data element 2210 that stores one or more command lists or pointers to command lists.

The HSP memory 211 may be HSP memory circuitry, and may be referred to as the HSP memory circuitry. The HSP memory 211 is coupled to the floating point circuitry 2200. The HSP memory 211 may have the command lists stored therein. The HSP memory 211 may include a plurality of registers having addresses associated respectively therewith. The registers of the HSP memory 211 may be accessible by the HSP processing circuitry 2200 as buffers for storing intermediate data during execution of a command list.

The event controller or circuit 2100 may receive event triggers from a variety of sources, and may output respective command list identifiers (or "command list numbers") to the HSP processing circuitry 2200 in response to the event triggers. The event controller 2100 may include event controller circuitry, and may be referred to as the event controller circuitry. The event controller 2100 includes a plurality of interfaces 2110, request processing circuitry 2120 and priority encoder or encoding circuitry 2130.

The plurality of interfaces 2110 may include an analog-to-digital converter (ADC) interface 2111, a streaming interface 2112, a trigger interface 2113, a CPU event interface 2114, an HSP event interface 2115, other suitable interfaces, or a combination thereof. The interfaces 2110 are coupled to the request processing circuitry 2120.

Each of the interfaces 2110, in operation, may receive one or more event triggers from a source component in data communication therewith. The ADC interface 2111 receives event triggers from ADC peripherals, such as the peripheral 120. The streaming and CPU event interfaces 2112, 2114 are coupled to the application processing circuitry 220, and receive event triggers from the application processing circuitry 220. The HSP event interface 2115 receives event triggers generated by internal circuitry of the HSP 210. The trigger interface 2113 may be configured by the application processor 220, and receives event triggers from sources other than the peripheral 120, the application processor 220, and the HSP 210. In one embodiment, the application processor 220 generates a shared event trigger with one or more of the other interfaces 2110, such as the ADC interface 2111, which is described in greater detail with reference to FIG. 4.

Each of the interfaces 2110 may generate an event in response to a received event trigger. As shown in FIG. 2, the ADC interface 2111 generates an ADC event in response to an event trigger received from an ADC peripheral, such as the peripheral 120. The streaming interface 2112 generates a streaming event in response to an event trigger received from the application processing circuitry 220. The trigger interface 2113 may generate a trigger event in response to an event trigger selected by the application processing circuitry 220. The CPU event interface 2114 generates a CPU event in response to an event trigger received from the application processing circuitry 220. The HSP event interface 2115 may generate an HSP event in response to an event trigger received from the HSP 210.

The request processing circuitry 2120 is coupled to the interfaces 2110 and the priority encoder 2130. The request processing circuitry 2120 processes events outputted by the interfaces 2110 and received by the request processing circuitry 2120. The request processing circuitry 2120 generates process requests associated with the events outputted by the interfaces 2110. As shown in FIG. 2, the request processing circuitry 2120 may generate many process requests, labeled "PROCESS REQUEST 0 . . . PROCESS REQUEST N." Each of the process requests is associated with one of the events outputted by the interfaces 2110. The process requests may be outputted sequentially, for example, on a first-in-first-out (FIFO) basis, as they are received from the interfaces 2110.

Each process request includes an event identifier. In one embodiment, each process request includes an associated priority. In one embodiment, the request processing circuitry 2120 may assign a priority on a first-in-first-out (FIFO) basis. For example, a CPU event received prior to an HSP event may have a higher priority than (e.g., will generally be processed before) the HSP event. In one embodiment, the request processing circuitry 2120 assigns priority with consideration to the type of event received. For example, the request processing circuitry 2120 may move any received CPU event to a higher position in a queue than other types of events. In one embodiment, the request processing circuitry 2120 may generally order (or queue, or prioritize) events using a FIFO method, with exceptions available for one or more types of events (e.g., CPU events, HSP events). For example, when the system 10 includes two or more of the peripherals 120, such as one or more different types of sensors, similar sensors in different physical locations, or other configurations, higher priority may be given event triggers arriving from certain of the peripherals 120 than from others of the peripherals 120. As one non-limiting example, cameras 120 at a front of a vehicle may be given higher priority than cameras 120 at a rear of the vehicle. In another non-limiting example, all cameras 120, a time-of-flight sensor 120, or other peripherals 120 may be given higher priority than a positioning (e.g., global positioning system) receiver 120 or temperature sensor 120. In one embodiment, prioritization logic for assigning priority to each process request is configured by the application processor 220.

The priority encoder 2130 is coupled to the request processing circuitry 2120 and the HSP processing circuitry 2200. The priority encoder 2130 receives the process requests outputted from the request processing circuitry 2120. The priority encoder 2130 outputs a command list number associated with each respective process request to the HSP processing circuitry 2200. In FIG. 2, the command list number is labeled "COMMAND LIST NUMBER." The command list number is an identifier associated with the command list that is to be executed in response to the event of the process request. In one embodiment, the command list number is a pointer to a register in which the command list is stored. In one embodiment, the priority encoder 2130 outputs a wakeup signal to the HSP processing circuitry 2200, which may direct the HSP processing circuitry 2200 to receive the command list number.

In one embodiment, the priority encoder 2130 stores multiple process requests, and may output the associated command list numbers to the HSP processing circuitry 2200 based on respective priority of each of the multiple process requests. For example, during execution of a command list, the priority encoder 2130 may receive a first request having a low priority, then a second request having a high priority. Upon completion of execution of a current command list, although the first request was received before the second request, the priority encoder 2130 may output a command list number associated with the second request before outputting a command list number associated with the first request due to the higher priority of the second request.

In one embodiment, the HSP processing circuitry 2200 has stored therein a data element 2210. Command lists may be associated with respective event triggers in the data element 2210. The data element 2210 is described in greater detail with reference to FIGS. 3A, 3B and 3D. Following a command list number being received by the HSP processing circuitry 2200, the HSP processing circuitry 2200 executes the command list associated with the command list number. In one embodiment, the execution is without possibility of interruption by another command list number, for example, associated with a process request having a higher priority. In one embodiment, the data element 2210 is stored in the HSP memory 211.

Following completion of executing the command list associated with the command list number, the HSP processing circuitry 2200 may have generated output data and store the output data in memory, such as in the device memory 21, which may be shared between the application processing circuitry 220 and the HSP 210. Following storing of the output data in the memory, the application processing circuitry 220 may retrieve the output data. In one embodiment, the HSP 210 notifies the application processing circuitry 220 to indicate that executing of the command list is completed and the output data is ready for retrieval. In this way, the application processing circuitry 220 may operate in a low-power mode or complete other tasks while waiting for the output data to be generated and stored by the HSP 210.

Figures 3A, 3B:
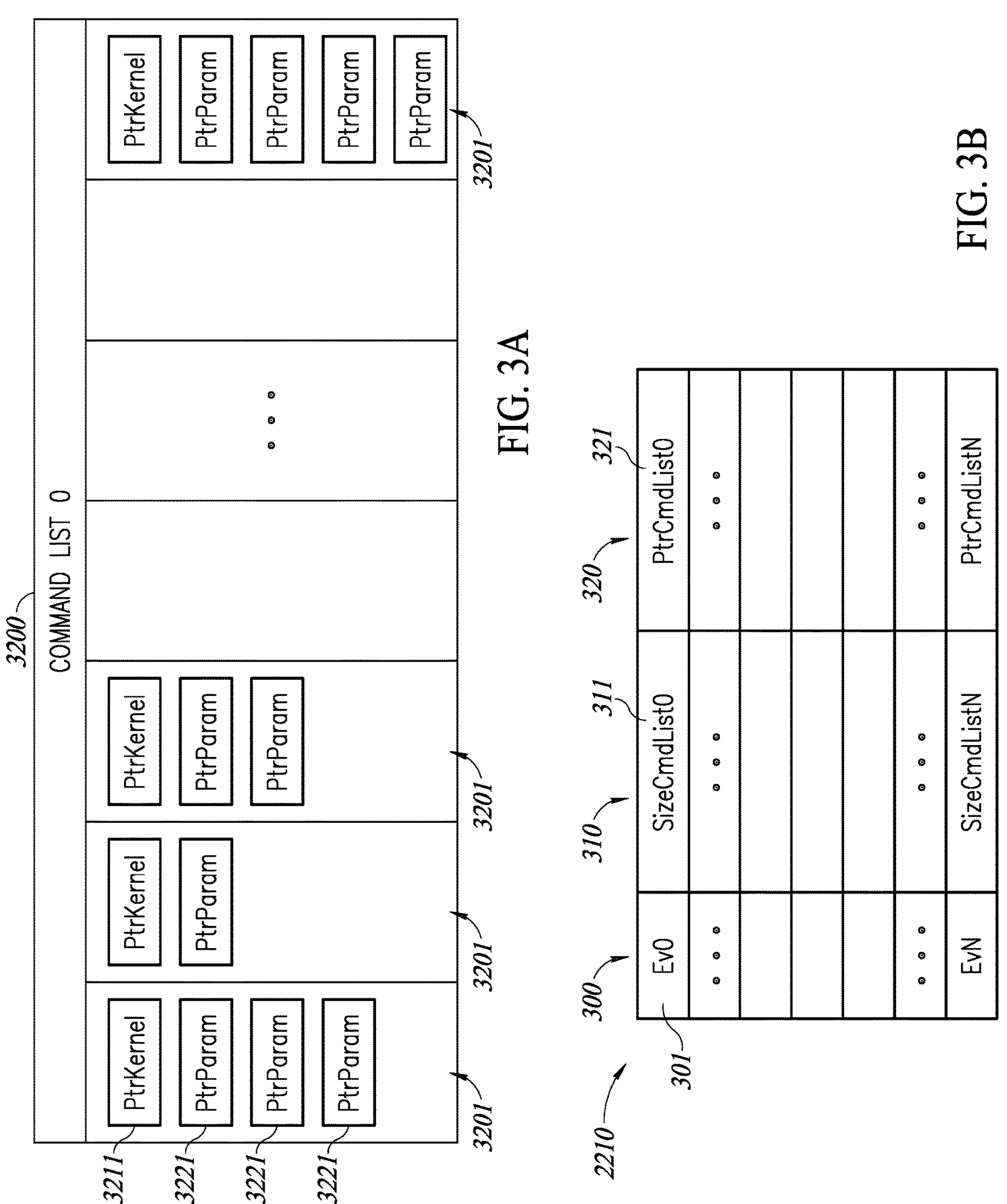
FIGS. 3A-3D are diagrams of command lists in accordance with various embodiments.
Figure 3C:
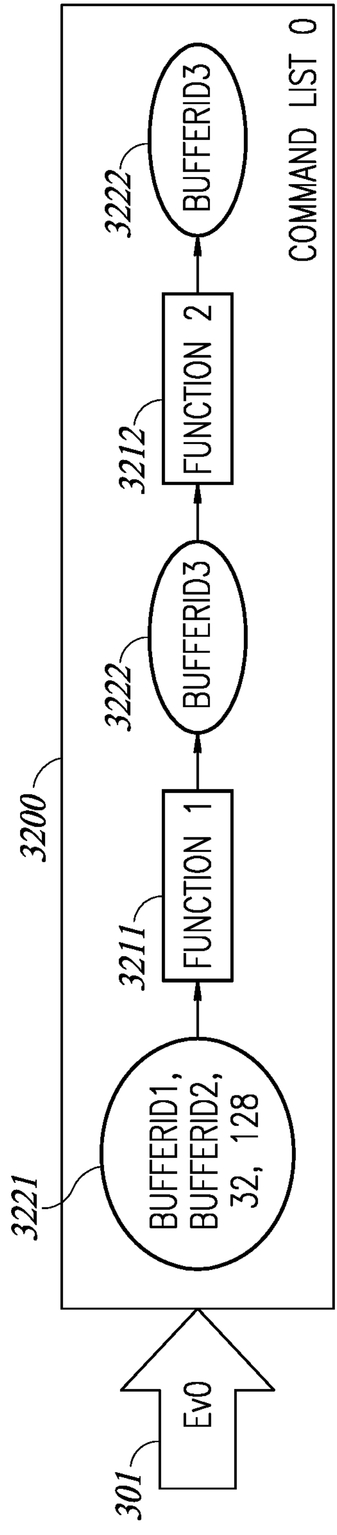
Figure 3D:
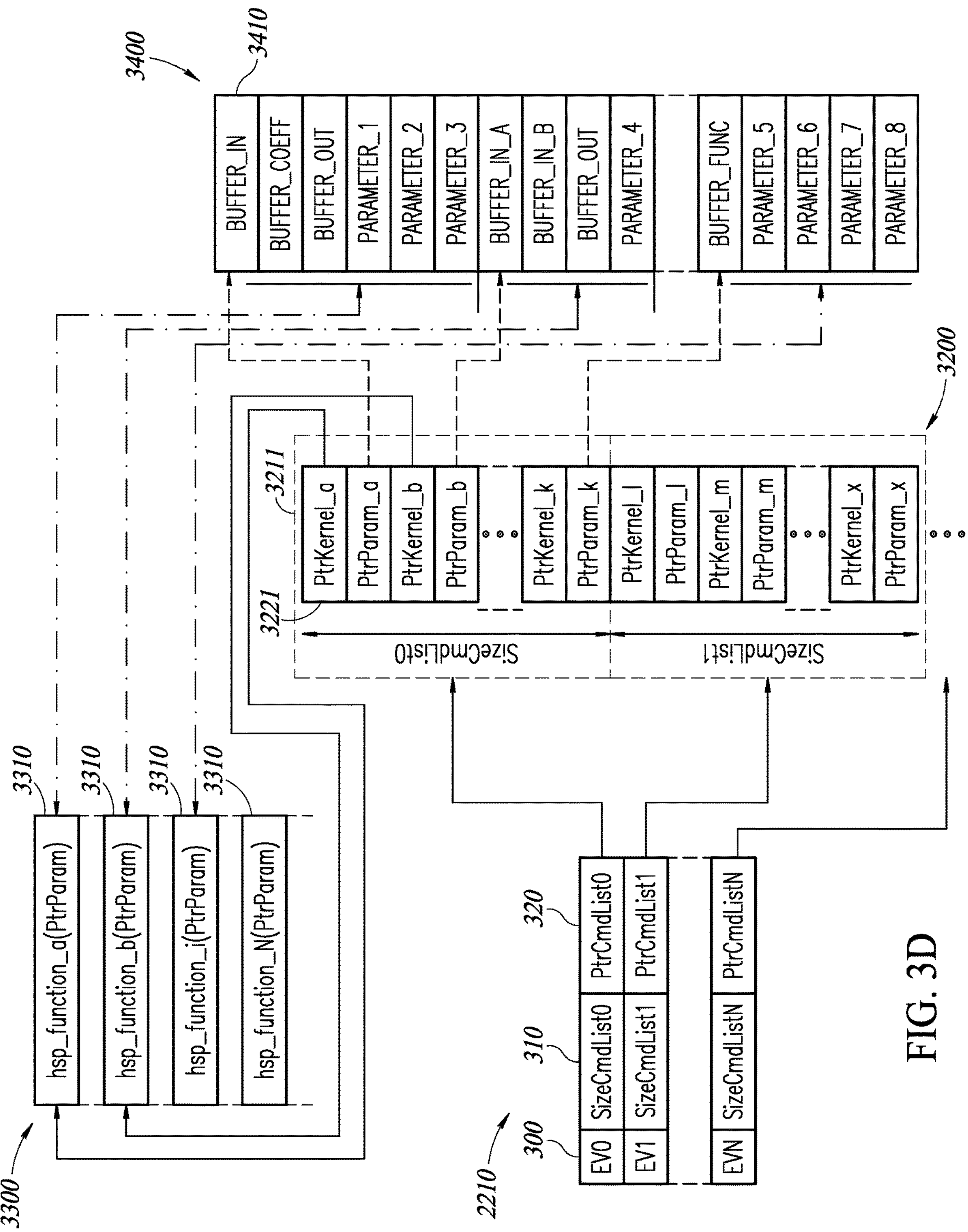

FIGS. 3A-3C illustrate a command list 3200, the data element 2210, and execution of a command list in response to an event trigger 301 in accordance with various embodiments. FIG. 3D illustrates a diagram of the command list 3200, the data element 2210, a functions table 3300 and a parameter table 3400 stored in the HSP memory 211, in accordance with various embodiments.

In FIG. 3A, a command list 3200, labeled "Command list0," is illustrated in accordance with various embodiments. The command list 3200 includes a plurality of command sets 3201. Each command set 3201 may include a function identifier 3211, e.g., a pointer, labeled "PtrKernel" in FIG. 3A, and a parameter identifier 3221, e.g., a pointer, labeled "PtrParam" in FIG. 3A. In some embodiments, the function identifier 3211 is a pointer to an address in the HSP memory 211 at which a function is located. For example, as shown in FIG. 3D, a function identifier 3211 labeled "PtKemal_a" is a pointer to an address in read-only memory (ROM) of the HSP memory 211 at which a function 3310 labeled "hsp_function_a" is stored. In some embodiments, the parameter identifier 3221 is a pointer to an address in the HSP memory 211 at which one or more parameters are located. For example, as shown in FIG. 3D, the parameter identifier 3221 points to a plurality of parameters 3410 stored in the parameter table 3400. In one embodiment, each command set 3201 includes a single (e.g., only one) parameter identifier 3221. One benefit of providing a single pointer (e.g., the parameter identifier 3221) for multiple parameters 3410 is having a uniform structure for all function prototypes (e.g., each pair of a function identifier 3211 and a parameter identifier 3221). In one embodiment, each parameter 3410 is associated with a different pointer (e.g., multiple parameter identifiers 3221). In some embodiments, the command list 3200 includes one or more function identifiers 3211, one or more parameter identifiers 3221, or a combination thereof.

The command list 3200 may be one of a plurality of command lists 3200 pointed to by the data element 2210, illustrated conceptually in FIG. 3B. The data element 2210 may include a plurality of command list identifiers 320 associated with a plurality of respective event triggers 300, and associated with a plurality of respective size parameters 310. For example, the command list 3200 may be pointed to by the command list identifier 321 labeled "PtrCmdList0," which may be a pointer 321 stored in a buffer in memory (e.g., the SOC memory 21, or the HSP memory 211), which may point to a buffer in memory (e.g., the SOC memory 21, or the HSP memory 211) in which the command list 3200 is stored. In some embodiments, the command lists 3200 and the data element 2210 are stored in the HSP memory 211 instead of the SOC memory 21, which improves access speed and reduces the chance of corruption of the data element 2210 and the command lists 3200, for example, by the application processor 200.

The command sets 3201 of the command list 3200 may be executed in order, for example, from left to right in terms of the illustration of FIG. 3A. Each function identifier 3211 may point to a function of the HSP 210, as illustrated in FIG. 3D. For example, the function identifier 3211 labeled "PtrKernel_a" points to the function 3310 labeled "hsp_function_a" of the functions table 3300. In one embodiment, each function identifier 3211 may point to a filter function (e.g., FIR, infinite impulse response (IIR)), a convolution function, a correlation function, a simple mathematical function (e.g., addition, multiplication, average, limit, absolute value, or the like), a trigonometric function (e.g., sine, cosine, modulus, or the like), a matrix function (e.g., matrix addition, matrix multiplication, absolute value, or the like), a spectral transformation function (e.g., fast Fourier transform (FFT), discrete cosine transfer (DCT), or the like), or other suitable function 3310 executable by the HSP processing circuitry 2200.

Each command set 3201 may include one or more parameter identifiers 3221. In one embodiment, each command set 3201 includes a single parameter identifier 3221, such as a single parameter pointer 3221 that points to a location of the parameter table 3400 shown in FIG. 3D. The parameter identifier 3221 may be a pointer to a buffer 3410 in memory that serves a purpose during execution of the function pointed to by the function identifier 3211. The parameter identifier 3221 may point to a static parameter or a dynamic parameter. For example, the parameter identifier 3221 may point to a location at which is a pointer to an input buffer, an output buffer, a dynamic parameter buffer, or the like. The parameter identifier 3221 may point to a static parameter itself. The input buffer may contain input data to be processed by execution of the function. The output buffer may be a location in which output data resulting from the executing of the function may be stored. In many embodiments, the input buffer and the output buffer are the same buffer, and, as such, a single buffer 3410 may be used for retrieving input data and for storing output data. The parameter buffer 3410 may point to an address that stores one or more dynamic parameters utilized to configure execution of the function. The parameter buffer 3410 may store a static parameter utilized to configure execution of the function. For example, the parameter buffer 3410 may point to a buffer that stores a filter coefficient to be used during execution of a FIR function. The parameter identifier 3221 may point to the parameter buffer 3410 that stores the static parameter. Example static parameters are sample rate and transform size used to configure execution of an FFT operation. Each parameter buffer 3410 may be associated with an address and size (e.g., number of bytes).

A number of command sets 3201 in a command list 3200 may be described by the size parameter 310 associated with the command list 3200. For example, a size parameter 311 may be associated with the command list 3200 pointed to by the command list identifier 321. The size parameter 311 may indicate number of command sets 3201 in the command list 3200. During execution of the command list 3200, a simple conditional loop (e.g., a for loop) may be performed to execute each of the command sets 3201 in order for a number of iterations indicated by the size parameter 311. For example, when the command list 3200 includes seven command sets 3201, the size parameter 311 may equal seven. In the example illustrated in FIG. 3C, the size parameter 311 may be equal to two, as two functions 3211, 3212 are executed in the command list 3200 shown.

The HSP 210 generates the command lists 3200, and stores the command lists 3200 in the HSP memory 211. In one embodiment, the HSP 210 receives a data structure from the application processor 200 that describes the command lists 3200 to be generated, but is not the command lists 3200 themselves. The data structure may be referred to as a "command pre-list," which has the meaning of a list (e.g., computer code) that describes functions and their associated parameters (e.g., static parameters) that are to be translated by the HSP 210 to generate the command list 3200. Command pre-lists are received by the HSP 210 during an initialization phase of the HSP 210. In one embodiment, the application processor 200 sends all command pre-lists to the HSP 210 during the initialization phase. In the initialization phase, the HSP 210 translates function describers and parameter describers of the command pre-list into pointers, such as the function identifier 3211 and the parameter identifier 3221, respectively. Translating the functions and parameters into pointers speeds up execution time in a run phase of the HSP 210 in which the command lists 3200 are executed in response to event triggers 300.

During the initialization phase of the HSP 210, the HSP 210 stores all the parameters of each function 3310 into an internal memory area (e.g., the parameter table 3400) and creates a pointer (e.g., the function identifier 3211 labeled "PtrParam_a" in FIG. 3D) to locate the parameters. In some embodiments, each function 3310 receives only one parameter identifier 3221. The parameter identifier 3221 is a pointer to the first parameter of a list of parameters. Each function 3310 is encoded with the number of parameters to be read/written using the parameter identifier 3221. For example, as illustrated in FIG. 3D, the parameter identifiers 3221 labeled "PtrParam_a" points to a buffer 3410 storing a parameter labeled "BUFFER_IN," which is a first parameter in a list of parameters labeled "BUFFER_IN," "BUFFER_COEFF," "BUFFER_OUT," 'PARAMETER_1," "PARAMETER_2" and "PARAMETER_3."

As shown in FIG. 3D, the HSP internal memory 211 stores a command list address table (e.g., the data element 2210), which is populated during the HSP 210 initialization phase, command lists 3200, which are populated during the HSP initialization phase, and a parameter table 3400, which is populated during the initialization phase.

The command list address table associates each event trigger 300 provided by the priority encoder 2130 with an address of the corresponding command list 3200. For example, the command list identifier 320 labeled "PtrCmdList0" points to a command list 3200 including function identifiers 3211 labeled "PtrKernel_a," "PtrKernel_b," . . . "PtrKernel_k." The command lists 3200 may be a set of address pointers (e.g., the function identifiers 3211) pointing to kernel functions (e.g., the functions 3310) of the HSP 210, and an associated pointer (e.g., the parameter identifier 3221) pointing into the parameter table 3400. In one embodiment, when a function 3310 is run, the only argument the function 3310 receives is the parameter identifier 3221, which is an address where the associated parameters are stored in the parameter table 3400. Each function 3310 is encoded with the number of parameters to retrieve.

In some embodiments, each command set 3201 only includes one parameter identifier 3221, which speeds up processing. For example, moving from one command set 3201 to the next command set 3201 may always request a step by 2, which is more efficient than processing command sets 3201 having variable length, such as if each parameter in the command set 3201 were pointed to by a respective parameter identifier 3221.

Figure 4:
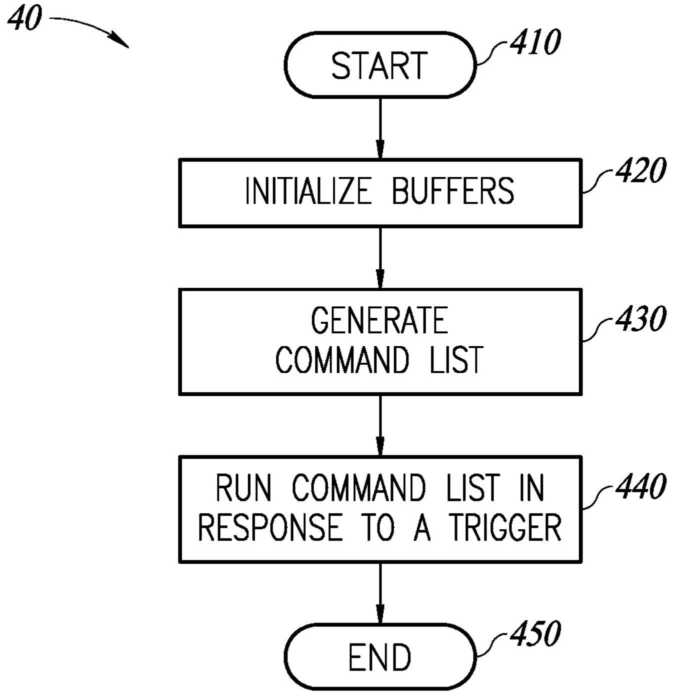
FIGS. 4-6 are diagrams of a method in accordance with various embodiments.
Figures 5, 6:
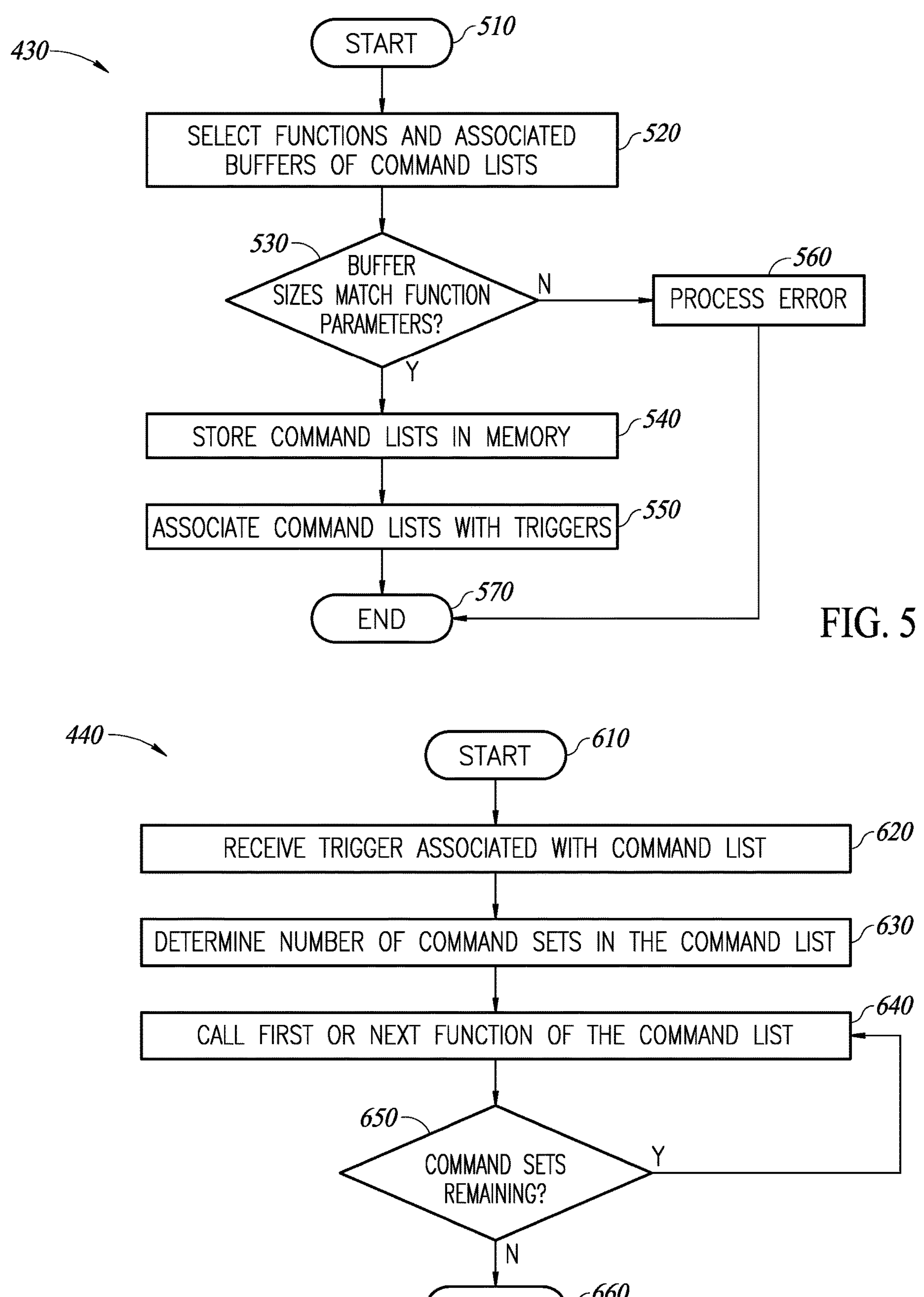

FIGS. 4-6 illustrate flowcharts of a method of generating output data in accordance with various embodiments.

FIG. 4 illustrates the method 40 in accordance with various embodiments. Method 40 begins at act 410. The following description of FIGS. 4-6 makes reference to components of the system 10 for purposes of illustration, but the method 40 may be performed by systems having different configuration than the system 10.

In act 420, buffers are initialized. The buffers may be the input buffers, output buffers, parameter buffers, and the like pointed to by the parameter identifiers 3221. In one embodiment, the buffers are buffers associated with all command lists to be stored. Initializing the buffers may include allocating memory to the buffers, creating a memory map, setting values of data stored in the buffers, or a combination thereof. In some embodiments, the HSP 210 handles memory resources for internal buffers. For the internal buffers, the application processor 200 may indicate to the HSP 210 how the internal buffers are to be initialized. For example, the application processor 200 may indicated that no initialization is required, that the internal buffers are to be initialized with a constant value (e.g., all internal buffers set to 0, 0x5555, or another suitable value), or that the internal buffers are to be initialized with an external pattern provided by the application processor 200. For example, once the internal buffer is created, the HSP 210 may initialize the internal buffer with a data pattern provided by the application processor 200, such as for initializing the internal buffer that stores filter coefficients.

Act 420 may be performed by the application processing circuitry 220. Prior to proceeding to act 430, the application processing circuitry 220 may generate command pre-lists in preparation for generating the command lists in the HSP 210. The application processing circuitry 220 may select functions and buffers associated therewith for each command list to be stored in the HSP 210. Prior to uploading the command pre-lists to the HSP 210, the application processing circuitry 220 may attempt to initialize buffers in memory for use by the HSP 210 during execution of the command lists. For example, the application processing circuitry 220 may initialize input buffers, output buffers and parameter buffers for an FIR function, an FFT function, an absolute value function, or the like. The application processing circuitry 220 also allocates in memory all objects to be requested by the command lists, such as filter instances, transform instances, or the like. Once all function instances and buffers are allocated, the application processing circuitry 220 may upload the command pre-lists to the HSP 210.

In act 430, following initiation of buffers in act 420, command lists are generated. Each command list may be similar to the command lists 3200 described with reference to FIGS. 3A-3C, and may include a plurality of function identifiers and a plurality of respective parameter identifiers. Each of the command lists is associated with a respective event trigger. The HSP 210 may verify and localize (e.g., translate) the command pre-lists during generation of the command lists (e.g., the command lists 3200) in act 430, which is described in greater detail below with reference to FIG. 5.

In act 440, following generation of the command lists in act 430, one of the command lists is run (e.g., executed) in response to a received event trigger. Act 440 is described in greater detail with reference to FIG. 6.

FIG. 5 illustrates act 430 in accordance with various embodiments. The process shown in FIG. 5 begins at act 510. In act 520, function and associated buffers are selected. In one embodiment, the functions are selected one function at a time. Selection of the function and associated buffers may be performed by the HSP 210 based on the command pre-lists received from the application processing circuitry 220. For example, an FIR or FFT function may be selected, and associated input buffer, output buffer, decimation factor buffer (e.g., for a FIR function), or the like may be selected. The method 430 proceeds from act 520 to act 530.

In act 530, the HSP 210 verifies whether the function and associated buffers are allocated properly. For example, the FIR function of the HSP 210 may be associated with an input buffer having an input size (e.g., 32 bits), an output buffer (e.g., 32 bits) having an output size, and a parameter buffer having a parameter size (e.g., 16 bits). When sizes of the buffers allocated by the application processing circuitry 220 match function parameters of the HSP 210, the process proceeds to act 540. When the sizes of the buffers do not match the function parameters (e.g., the parameter buffer is allocated as 8 bits, but should be 16 bits), a memory configuration error may be reported, corresponding to act 560. In response to the memory configuration error, the application processing circuitry 220 may generate the command pre-list including reallocating the correct amount of memory, and re-upload the updated command pre-list to the HSP 210. Acts 520, 530, 560 may be repeated for each function of each command pre-list prior to proceeding to act 540.

In act 540, the command lists are stored in memory. In one embodiment, the HSP 210 stores the command lists 3200 in the data element 2210. In one embodiment, the command lists 3200 are stored in the HSP memory 211.

Storing of the command lists may be performed by the HSP 210. In one embodiment, the command pre-lists are first stored in a buffer accessible by both the application processor 220 and the HSP 210, for example, in the device memory 21. Following storage of the command pre-lists in the shared buffer, the HSP 210 may translate the received command pre-lists into executable instructions that are efficient for execution on the HSP 210. In some embodiments, on the application processor 200 side, a C programming language function may be associated with each command pre-list. In such configurations, the command pre-lists may not be present in the memory 21, and are generated by C code and stored directly into the HSP memory 211. The executable instructions may be stored as the command lists 3200 in memory (e.g., the HSP memory 211). Storing the command lists 3200 may include the HSP 210 allocating function instances and buffers in the HSP memory 211. The function identifiers, which may be pointers, of the command lists may point to the function instances in the HSP memory 211. The parameter identifiers may point to buffers in the HSP memory 211.

In act 550, the command lists are associated with respective event triggers. For example, following storage of the command lists 3200 in the HSP 210, the command lists 3200 may be associated with respective event triggers 300 (see FIG. 3B). For example, a CPU event trigger corresponding to a number of samples received from a sensor 120 may be associated with a sensor data processing command list 3200. Each command list 3200 may be associated with a different event trigger 300. In one embodiment, one or more of the command lists 3200 may be associated with multiple event triggers. Following generation and storage of the command lists 3200 in the HSP 210, and association of event triggers 300 with the command lists 3200, the HSP 210 may enter an autonomous execution (or "program run") mode, in which the HSP 210 waits for event triggers 300, corresponding to act 507 of FIG. 5.

FIG. 6 illustrates act 440 of FIG. 4 in accordance with various embodiments. Act 440 includes running a command list in response to a received event trigger, and begins with act 610.

In act 620, an event trigger is received associated with a command list. For example, following generation and storage of the command lists 3200 in the HSP 210, the HSP 210 may be in the autonomous execution mode, in which the HSP 210 waits for event triggers 300.

In act 630, following an event trigger being received that is associated with a command list, a number of command sets in the command list is determined.

For example, the number of command sets 3201 may be determined by reading the buffer storing the size parameter 310 (e.g., the size parameter 311 associated with the command list 3200 pointed to by the command list pointer 321). The number of command sets 3201 may indicate how many functions are to be called in the command list 3200. For example, the command set 3200 illustrated in FIG. 3C may have a number of command sets equal to 2.

In act 640, a first or a next function of the command list is called. For example, in the command list 3200 shown in FIG. 3C, the function 3211 may be called. Following completion of executing the function called in act 630, if further command sets are remaining in the command list (e.g., as checked in act 650), act 640 is performed again, until the last command set of the command list has finished executing. For example, in the command list 3200 shown in FIG. 3C, the function 3212 may be called. When executing the function, the HSP processing circuitry 2200 may retrieve an operand (e.g., input data, function coefficients, or the like) of the function from a buffer identified by a parameter identifier of the plurality of parameter identifiers 3221 associated with the function identifier 3211 (see FIG. 3A). For example, the HSP processing circuitry 2200 may retrieve a decimation factor coefficient from a parameter buffer associated with a FIR function.

If no command sets are remaining in the command list, the process of FIG. 6 proceeds to act 660. Generally, following execution of the last command set 3201 of the command list 3200, output data is generated and stored in a buffer of memory (e.g., the SOC memory 21). In one embodiment, following execution of the last command set 3201, an interrupt is generated to wake up an application running on the application processor 220 that generated the event trigger 300 that led to execution of the command list 3200. Following generation of the output data, the HSP 210 may wait for another event trigger.

In some embodiments, the method 40 includes a number of operations. It should be noted that the operations of the method 40 may be rearranged or otherwise modified (e.g., removed) within the scope of the various embodiments. It should further be noted that additional processes may be provided before, during, and after the method 40, and that some other processes may be only briefly described herein. For example, error processing acts may be present following acts 540 and 640, which may encounter memory corruption errors (e.g., act 540) or overrun errors (e.g., act 640).

FIG. 3C illustrates an example of execution of a command list 3200 in accordance with various embodiments. The command list 3200 may be executed in response to a received event trigger 301 using the method 40. A first function 3211 may be executed using buffers 3221, which may include a first buffer ("BufferId1"), a second buffer ("BufferId2"), a first parameter ("32") and a second parameter ("128"), and third buffer 3222 ("BufferId3"). In one embodiment, the first buffer is an input buffer, and the second buffer may be a parameter buffer The first and second parameters may be static parameters, such as a number of filter taps, a number of samples to process, or other suitable parameters. The third buffer 3222 may be an output buffer. Following execution of the first function 3211, the third buffer 3222 may contain first output data generated by the first function 3211 acting on input data stored in the first buffer. A second function 3212 may be executed following execution of the first function 3211. The second function 3212 may be associated with the buffer 3222, for example, if the second function 3212 writes second output data back to the buffer 3222 following processing of the first output data stored in the buffer 3222 by the first function 3211. In one embodiment, the first and third buffers, which are input and output buffers, are located in the SOC memory 21, and the second buffer, which is a parameter buffer, is located in the HSP memory 211.

It should be appreciated that, in some embodiments, a sophisticated function may include processing by the HSP 210 and the application processor 220. For example, the HSP 210 may be triggered to execute a first command list 3200 by an event trigger 300 received by the ADC interface 2111, and may generate and store first output data. The application processor 220 may perform processing on the first output data, and generate and store second output data. Following generation and storage of the second output data by processing the first output data by the application processor 220, a second event trigger 300 may be received by the CPU event interface 2114 of the HSP 210. The HSP 210 may then execute a second command list 3200 associated with the second event trigger 300 received from the application processor 220. The second command list 3200 may take the second output data as input data, and may generate and store third output data, for example, in the SOC memory 21. In this way, greater flexibility and efficiency may be achieved by leveraging different processing circuitry of the application processor 220 and the HSP 210.

Embodiments may provide advantages. Use of command lists 3200 generated and stored on the HSP 210 allows for generation of sophisticated functions without the complexity of a compiler or interpreter, which improves speed, reactivity and flexibility of the system 10 including the HSP 210. The HSP 210 may execute the command list autonomously, which allows the application processor 220 to enter a low-power mode to save even more power while the HSP 210 is executing the command list 3200.

In an embodiment, a device includes an event interface and processing circuitry coupled to the event interface. The event interface receives an event trigger, the event trigger being associated with a command list, the command list being stored in memory circuitry. The command list includes command sets, each of which includes a function identifier and a plurality of parameter identifiers. The processing circuitry executes the command list in response to the received event trigger, generating output data; and stores the output data. The function identifier of the command set is associated with a function of the processing circuitry.

In an embodiment, a system includes an application processor and a hardware signal processor. The application processor generates event triggers. The hardware signal processor is electrically connected to the application processor. The hardware signal processor receives an event trigger. The event trigger is associated with a command list stored in memory circuitry. The command list includes a plurality of command sets. A command set of the plurality of command sets includes a function identifier and a plurality of parameter identifiers. The function identifier is associated with a function of the hardware signal processor. The hardware signal processor executes the command list in response to the received event trigger, generating output data, and stores the output data.

In one embodiment, a method includes: generating and storing a plurality of command lists, each of the plurality of command lists including a plurality of function identifiers and a plurality of respective parameter identifiers, each of the plurality of function identifiers being associated with a function of a hardware signal processor; initializing a plurality of respective buffers associated with the plurality of parameter identifiers of the plurality of command lists; associating a plurality of respective event triggers with the plurality of command lists; executing one of the plurality of command lists by the hardware signal processor, the executing being in response to a received event trigger, the executing generating output data; and storing the output data.

In one embodiment, a non-transitory computer-readable medium causes one or more processors to perform one or more automated operations. The automated operations include: generating and storing a plurality of command lists, each of the plurality of command lists including a plurality of function identifiers and a plurality of respective parameter identifiers, each of the plurality of function identifiers being associated with a function of a hardware signal processor; initializing a plurality of respective buffers associated with the plurality of parameter identifiers; associating a plurality of respective triggers with the plurality of command lists; and executing one of the plurality of command lists by the hardware signal processor, the executing being in response to a received trigger, the executing generating output data.

In one embodiment, a device includes an application processor and a hardware signal processor coupled to the application processor. The hardware signal processor, in operation: receives a command pre-list during an initialization phase of the hardware signal processor, the command pre-list including a plurality of function identifiers, each of the plurality of function identifiers being associated with a respective plurality of parameter identifiers; generates a command list based on the command pre-list during the initialization phase; and stores the command list in memory circuitry.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:

an application processor, which, in a run phase of operation:
enters a low-power mode while a hardware signal processor autonomously executes a command list; and
based on receiving an interrupt from the hardware signal processor, exits the low-power mode; and
a hardware signal processor coupled to the application processor, wherein the hardware signal processor:
in an initialization phase of operation:
receives, from the application processor, a command pre-list, the command pre-list including a plurality of function describers, each of the plurality of function describers being associated with a respective plurality of parameter describers;
generates a plurality of command lists based on the command pre-list, the generating the plurality of command lists including:
translating the command pre-list into pointers; and
verifying that sizes of buffers allocated to function parameters corresponding to the pointers match the function parameters;
stores the plurality of command lists in memory circuitry;
generates a command list address table based on the plurality of command lists, wherein an entry in the command list address table associates a command list of the plurality of command lists with an event and a command list size, the command list size being a number of command sets included in the command list associated with the entry; and
stores the command list address table in the memory circuitry; and
in the run phase of operation:
receives an event trigger;
identifies a command list corresponding to the event trigger;
autonomously executes, based on the command list size, the command sets included in the identified command list; and
in response to completing execution of the command sets included in the identified command list, provides the interrupt to the application processor.

2. The device of claim 1, wherein the hardware signal processor, in operation:
checks and translates each of the plurality of function describers of the command pre-list during the generating of the plurality of command lists.

3. The device of claim 2, wherein the hardware signal processor, in operation:
switches to the run phase after storing the plurality of command lists and the command list address table.

4. The device of claim 1, wherein a command set includes a function identifier and a parameter identifier.

5. The device of claim 4, wherein the function identifier is a pointer pointing to a function stored in the memory circuitry.

6. The device of claim 4, wherein the parameter identifier is a pointer pointing to a parameter stored in the memory circuitry.

7. The device of claim 4, wherein the parameter identifier is a pointer pointing to a buffer in the memory circuitry, the buffer storing a dynamic parameter.

8. The device of claim 4, wherein the command set includes a plurality of function identifiers, and a function identifier of the plurality of function identifiers is associated with a plurality of parameter identifiers.

9. A system comprising:

an application processor, wherein the application processor, in operation:

generates command pre-lists; and a hardware signal processor coupled to the application processor, wherein the hardware signal processor:

in an initialization phase of operation:

receives a command pre-list, the command pre-list including a plurality of function describers, a function describer of the plurality of function describers being associated with a plurality of parameter describers;

generates a plurality of command lists based on the command pre-list, the generating the plurality of command lists including:

translating the command pre-list into pointers; and verifying that sizes of buffers allocated to function parameters associated with the pointers match the function parameters;

stores the plurality of command lists in respective memory locations;

generates a command list address table based on the plurality of command lists, wherein an entry in the command list address table associates a command list of the plurality of command lists with an event and a command list size, the command list size being a number of command sets included in the command list associated with the entry; and stores the command list address table; and in a run phase of operation:

receives an event trigger;

identifies a command list of the plurality of command lists corresponding to the event trigger;

autonomously executes, based on the command list size, the command sets included in the identified command list; and in response to completing execution of the command sets included in the identified command list, provides an interrupt to the application processor.

10. The system of claim 9, wherein the application processor, in operation, responds to the interrupt by exiting a low-power mode of operation.

11. A method, comprising:

receiving a command pre-list during an initialization phase of a hardware signal processor, the command pre-list including a plurality of function describers, each of the plurality of function describers being associated with a respective plurality of parameter describers;

generating a plurality of command lists based on the command pre-list during the initialization phase, the generating the plurality of command lists including:

translating the command pre-list into pointers; and verifying that sizes of buffers allocated to function parameters associated with the pointers match the function parameters;

storing, during the initialization phase, the plurality of command lists in respective memory locations;

generating, during the initialization phase, a command list address table based on the plurality of command lists, wherein an entry in the command list address table associates a command list of the plurality of command lists with an event and a command list size, the command list size being a number of command sets included in the command list associated with the entry;

storing, during the initialization phase, the command list address table; and in a run phase of the hardware signal processor:

responding to an event trigger by identifying a command list of the plurality of command lists corresponding to the event trigger;

autonomously executing, based on the command list size, the command sets included in the identified command list; and in response to completing execution of the command sets included in the identified command list, generating an application processor interrupt signal.

12. The method of claim 11, wherein the generating and storing a command list of the plurality of command lists includes:

generating executable instructions associated with the command list by the hardware signal processor; and storing the executable instructions in memory circuitry of the hardware signal processor.

13. A device comprising:

a memory, which, in operation, stores a plurality of command lists and a command list address table, wherein, entries in the command list address table associate command lists of the plurality of command lists with respective events and command list sizes, the command list size of an entry being a number of command sets included in the command list associated with the entry, and a command set includes a function identifier and a parameter identifier;

an event interface, wherein the event interface, in operation, receives an event trigger; and hardware processing circuitry coupled to the memory and to the event interface, wherein the hardware processing circuitry, in operation:

in an initialization mode of operation:

receives a command pre-list including a plurality of function describers, each of the plurality of function describers being associated with a respective plurality of parameter describers;

generates the plurality of command lists, the generating the plurality of command lists including:

translating the command pre-list into pointers; and verifying that sizes of buffers allocated to function parameters associated with the pointers match the function parameters;

stores the plurality of command lists at respective memory locations; and generates the command list address table; and in a run mode of operation:

identifies, based on the event trigger and an entry in the command list address table, a command list of the plurality of command lists;

executes, based on the command list size of the identified entry in the command list table, the command sets of the identified command list in response to the received event trigger, generating output data; and in response to execution of the command sets of the identified command list, generates an application processor interrupt signal.

14. The device of claim 13, wherein the event trigger is received from a peripheral device external to the device.

15. The device of claim 14, wherein the peripheral device includes a sensor.

16. The device of claim 13, wherein the executing of the identified command list is completed before execution of a command list associated with a subsequent event.

17. The device of claim 13, wherein:

the event interface, in operation:

generates a process request in response to the received trigger, the process request including a command list identifier associated with the command list;

assigns a priority to the process request; and transmits the command list identifier to the hardware processing circuitry based on the priority.

18. The device of claim 13, comprising:

application processing circuitry, which, in operation:

generates the command pre-list by selecting at least one function of the hardware processing circuitry; and stores the command pre-list in the memory.

19. The device of claim 13, wherein the event trigger is received from a processor coupled to the event interface.

20. The device of claim 18, wherein the application processing circuitry generates automotive control signals based on the output data.

21. The device of claim 13, wherein the hardware processing circuitry, in operation:

retrieves an operand of a function from a buffer pointed to by a parameter identifier.

* * * * *